Oct. 6, 1959     C. J. BARECKI     2,907,378
VEHICLE SEAT

Filed Oct. 16, 1958     2 Sheets-Sheet 1

INVENTOR
Chester J. Barecki

WITNESS
Harry S. Brown Jr.

BY John S. Braddock
ATTORNEY

Oct. 6, 1959          C. J. BARECKI          2,907,378
                       VEHICLE SEAT
Filed Oct. 16, 1958                        2 Sheets-Sheet 2
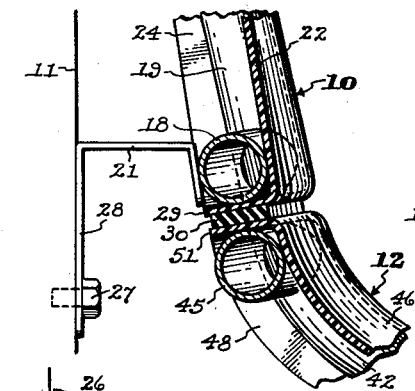
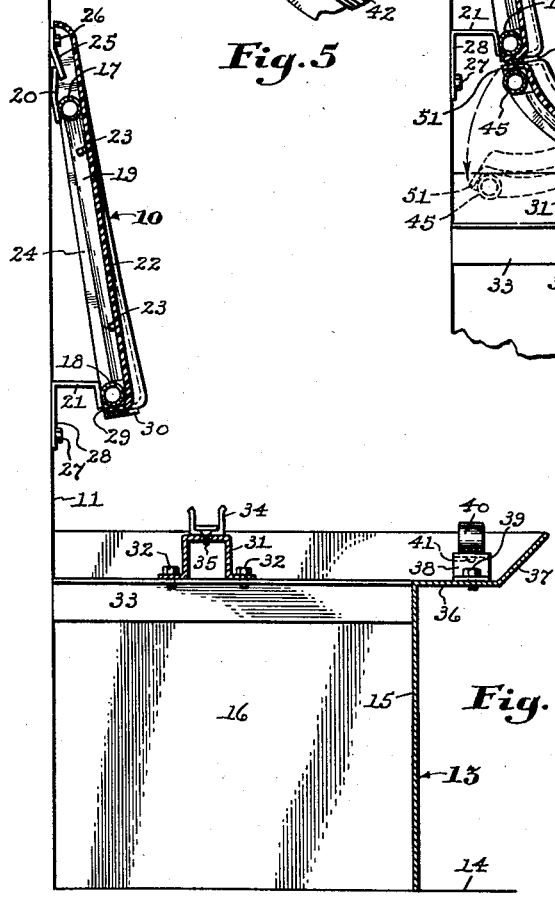
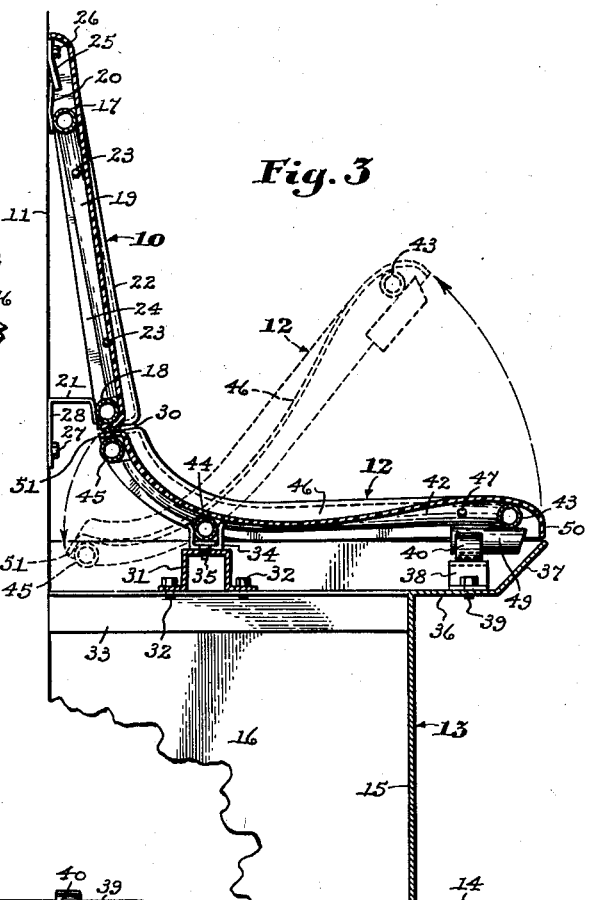
INVENTOR
Chester J. Barecki
WITNESS
Harry S. Brown Jr.
BY John S. Braddock
ATTORNEY

United States Patent Office 2,907,378
Patented Oct. 6, 1959

2,907,378

VEHICLE SEAT

Chester J. Barecki, Grand Rapids, Mich., assignor to American Seating Company, Grand Rapids, Mich., a corporation of New Jersey Application October 16, 1958, Serial No. 767,650

4 Claims. (Cl. 155—191)

The present invention relates to seats or chairs for vehicles and more particularly to seats primarily intended for installation in motor buses, railway cars and the like.

The primary objects of the invention are to provide an improved seat of the "longitudinal" type, i.e. the type of seat which is installed with its back against a side wall of the vehicle as distinguished from the "transverse" type of seat which is installed crosswise in the vehicle; to provide such a seat which is especially adapted for installation on a base enclosure which may house certain operating equipment and controls for the vehicle, and which is so constructed that the seat may be lifted at its front edge to give access to the interior of the base enclosure for adjusting controls under the seat, and in which the seat is also removable bodily to give full access to equipment thereunder in case such equipment requires repair or maintenance; and in general to provide such a vehicle seat which is sturdy and reasonably economical in construction, durable comfortable and attractive in appearance.

An illustrative embodiment of the invention is shown in the accompanying drawings, wherein:

Figure 3 is an enlarged vertical sectional view of the same taken on line 3—3 of Figure 2, the seat being shown in lowered, use position in full lines and in raised non-use position in dotted lines;

Figure 4 is a similar vertical sectional view, the seat being removed in this view; and Figure 5 is an enlarged, fragmentary vertical sectional view of certain parts of the structure shown in Figure 3.

Figure 1:
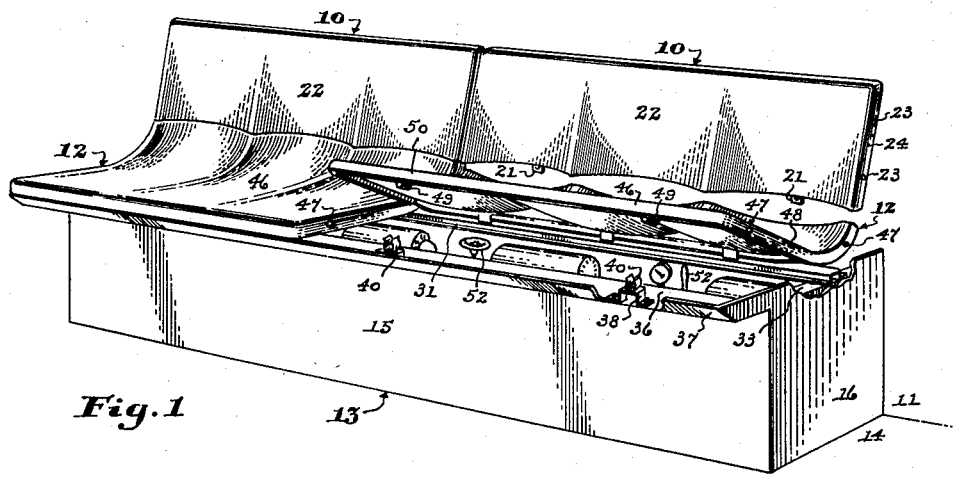
Figure 1 is a perspective view of two three-passenger vehicle seats and backs installed side-by-side along a side wall of a vehicle, one of the seats being shown in a raised or open position.
Figure 2:
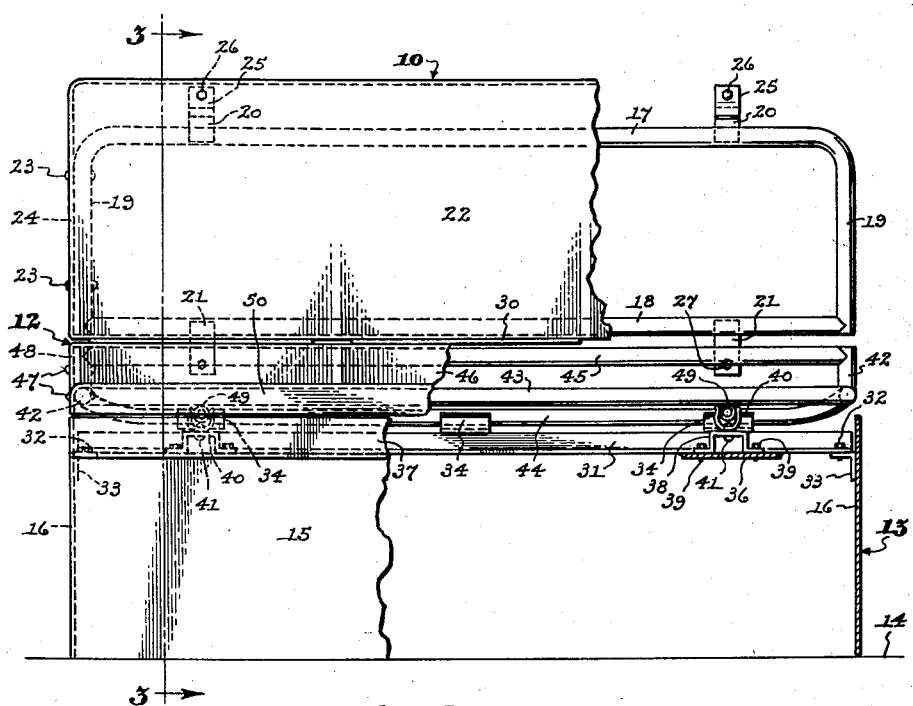
Figure 2 is a front elevational view of one of the three-passenger units, portions of the seat and back being broken away to reveal parts of the supporting base and frame therefor.

Referring now in detail to these drawings, the seat or chair structures shown in Figures 1 and 2 each comprises a three-passenger back 10 secured to the substantially vertical side wall 11 of a vehicle and a three-passenger seat 12 mounted on a base 13 secured to the side wall 11 and the floor 14 of the vehicle. The base 13 comprises an upwardly opening enclosure having a front wall 15 parallel to and spaced inwardly from the vehicle's side wall 11, and end walls 16 which are normal to the front wall 15 and the vehicle's side wall 11. The base enclosure's walls 15 and 16 may be secured in the vehicle as by welding.

The chair back 10 comprises a generally rectangular, tubular metal back frame having an upper rail 17, a lower rail 18 and side stiles 19.

Horizontally spaced, upwardly projecting lugs 20 are secured as by welding to the upper rail 17 of the back frame, and rearwardly extending brackets 21 are secured as by welding to the lower rail 18 of the back frame. A molded plastic back 22 is disposed over the back frame and is secured thereto as by means of rivets 23 passing through the frame's side stiles 19 and through side flanges 24 which extend rearwardly from the sides of the back and around said side stiles 19. The chair back is removably attached to the side wall 11 of the vehicle by sliding it upwardly until the lugs 20 engage behind the downwardly-inwardly extending lower portions of upper back clips 25 secured as by screws or bolts 26 to the vehicle's side wall 11, and then inserting screws 27 through the rear vertical portions 28 of the back supports 21 and into the vehicle wall 11. It will be seen that the plastic chair back 22 is thus inclined downwardly-inwardly, and it terminates well inwardly of the vehicle's side wall 11 and well above the seat level. The lower edge of the plastic back 22 has a rearwardly turned flange 29 to the bottom surface of which is secured an elongated rubber cushion element 30 by means of a suitable adhesive (see Figures 4 and 5).

A seat support bar 31 of downwardly opening hat-section has its opposite ends secured as by means of bolts or screws 32 to angle bars 33 which are secured as by welding to the base enclosure's end walls 16 near the latter's upper ends. The seat support bar 31 thus spans the base enclosure 13 from end to end intermediate the vehicle's side wall 11 and the enclosure's front wall 15, and as shown somewhat nearer the vehicle's wall 11. Horizontally spaced, upwardly opening bearing members 34, here shown as three in number, are secured to the seat support bar 31 by means of rivets or screws 35.

The upper front portion of the base enclosure's front wall 15 is turned inwardly at 36 and then inwardly-upwardly at 37, as best seen in Figures 3 and 4. Brackets 38 are secured by means of bolts or screws 39 to the inwardly turned upper portion 36 of the front wall 15, and upwardly opening U-shaped spring clips 40 are secured to the brackets 38 as by means of rivets 41.

The chair seat 12 comprises a generally rectangular, tubular metal seat frame having side rails 42, a front rail 43 and intermediate rail 44 at the approximate seat level, and a rear rail 45 above the seat level. A molded plastic seat 46 is disposed over the seat frame and is secured thereto by means of rivets 47 passing through the seat frame's side rails 42 and and through side flanges 48 which extend downwardly from the sides of the plastic seat 46 and around said side rails 42. Latch members 49 depend from the forward underside of the seat frame, being here shown as short lengths of metal tubing secured as by welding to the front rail 43 of the seat frame. The plastic seat 46 has a downwardly turned lip 50 at its front edge which, in the lowered position of the seat, meets the edge of the inwardly-upwardly sloping portion 37 of the base's front wall 15. The rear part of the seat 46 slopes rearwardly-upwardly in conformity with the seat frame's side rails 42 and terminates in a rearwardly extending flange 51 which, in the lowered position of the seat, abuts the cushion element 30 at the lower edge of the back 22. The plastic seat and plastic back present virtually continuous, contoured, bucket-type seats for the three chair-occupants.

The intermediate cross-bar or rail 44 of the seat frame is turnably disposed in the aligned, upwardly opening bearing members 34 on the seat support bar 31 so that the seat may be lifted at its front edge to give access to the interior of the base enclosure 13 when it is desired to make adjustments of the controls indicated at 52 in Figure 1. When the front of the seat is thus lifted the seat's rear portion swings downwardly as indicated in dotted lines in Figure 3, and when the seat is returned to its use position for occupancy seen in full lines the rear flange 51 comes to a cushioned stop against the cushion element 30 on the lower edge of the back. In this lowered position of the seat, the spring clips 40 grip the latch members 49 on the seat so that the seat is releasably maintained in this lowered position and is prevented from rattling.

In the event that repairs or other maintenance work on the equipment within the base enclosure 13 become necessary, the seat and seat frame may be lifted bodily out of the structure by detaching the latch members 49 from the spring clips 40 and lifting the intermediate rail 44 out of the bearing members 34.

It will thus be seen that the invention provides a vehicle seat and back structure which is well adapted for its intended use, and while but one specific embodiment of the invention is herein shown and described it will be understood that the invention comprehends such modifications thereof as may fall within the scope of the following claims.

I claim:

1. In a chair structure: a base; a seat support bar extending across the top of the base intermediate the front and rear of the base; upwardly opening bearing members secured to said seat support bar; a generally rectangular tubular metal seat frame having a front rail and an intermediate rail at the approximate seat level and a rear rail above the seat level; a molded plastic seat disposed over the seat frame and secured thereto, said seat extending rearwardly from the front rail and over the intermediate rail and thence rearwardly and upwardly over the rear rail; said intermediate rail of the seat frame being turnably disposed in said upwardly opening bearing members so that the seat frame and seat are swingable between a lowered use position and a raised non-use position, and said seat frame and seat being also removable bodily from the base by lifting the seat frame's intermediate rail out of the upwardly opening bearing members.

2. A chair structure according to claim 1 in which upwardly opening U-shaped spring clips are secured to the upper front of the base, and in which depending latch members on the forward underside of the seat frame are engageable in said spring clips to detachably secure the front edge of the seat in its lowered use position on the base.

3. A chair structure according to claim 1 in which the base comprises an upwardly opening enclosure the interior of which is accessible through its open top when the seat is in its raised non-use position.

4. A chair structure according to claim 1 in which the base has an upstanding wall in the rear thereof, and having a molded plastic back secured to said rear wall at its upper end and sloping forwardly-downwardly therefrom into meeting engagement with the rearward edge of the seat when the seat is in its lowered use position.

References Cited in the file of this patent

UNITED STATES PATENTS

| 511,881 | Dennis | Jan. 2, 1894 |
| 1,382,084 | Himes | June 21, 1921 |
| 1,960,436 | Finn | May 29, 1934 |
| 2,845,111 | Barecki | July 29, 1958 |